United States Patent
Kang et al.

(10) Patent No.: US 12,355,032 B2
(45) Date of Patent: Jul. 8, 2025

(54) ALKYNATED AND METHYL SULFONATED IMIDAZOLINE NON-AQUEOUS ELECTROLYTE ADDITIVE AND NONAQUEOUS ELECTROLYTE SOLUTION FOR LITHIUM SECONDARY BATTERY INCLUDING THE SAME AND LITHIUM SECONDARY BATTERY

(71) Applicant: LG Energy Solution, Ltd., Seoul (KR)

(72) Inventors: Yoo Sun Kang, Daejeon (KR); Chul Haeng Lee, Daejeon (KR); Jung Hoon Lee, Daejeon (KR); Sol Ji Park, Daejeon (KR); Jae Won Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/837,735

(22) PCT Filed: Mar. 7, 2023

(86) PCT No.: PCT/KR2023/003126
§ 371 (c)(1),
(2) Date: Aug. 12, 2024

(87) PCT Pub. No.: WO2023/172044
PCT Pub. Date: Sep. 14, 2023

(65) Prior Publication Data
US 2025/0112273 A1    Apr. 3, 2025

(30) Foreign Application Priority Data

Mar. 8, 2022 (KR) .................. 10-2022-0029662
Mar. 3, 2023 (KR) .................. 10-2023-0028790

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01)

(58) Field of Classification Search
CPC .................. H01M 10/0567; H01M 10/0525
USPC ................................. 429/328, 340
See application file for complete search history.

(56) References Cited

U.S. PATENT DOCUMENTS

| | | | | |
|---|---|---|---|---|
| 11,916,197 B2* | 2/2024 | Oh | ...... | H01M 10/0567 |
| 2001/0006751 A1* | 7/2001 | Gan | ...... | H01M 6/168 |
| | | | | 429/231.95 |
| 2017/0125847 A1* | 5/2017 | Yu | ...... | H01M 10/0567 |
| 2022/0131192 A1 | 4/2022 | Kim et al. | | |
| 2022/0140391 A1 | 5/2022 | Kim et al. | | |
| 2022/0320583 A1* | 10/2022 | Oh | ...... | H01M 10/052 |

FOREIGN PATENT DOCUMENTS

| | | |
|---|---|---|
| CN | 113130992 A | 7/2021 |
| EP | 3893312 A1 | 10/2021 |
| KR | 2009-0080298 A | 7/2009 |
| KR | 2020-0089623 A | 7/2020 |
| KR | 2020-0089638 A | 7/2020 |
| KR | 2020-0105227 A | 9/2020 |
| KR | 102179846 B1 | 11/2020 |
| KR | 2021-0138937 A | 11/2021 |
| KR | 2021-0152267 A | 12/2021 |

OTHER PUBLICATIONS

International Search Report for Application No. PCT/KR2023/003126 mailed May 31, 2023. 3 pgs.

* cited by examiner

*Primary Examiner* — Sean P Cullen
(74) *Attorney, Agent, or Firm* — Lerner David LLP

(57) ABSTRACT

An electrolyte solution additive for a lithium secondary battery, a non-aqueous electrolyte solution for a lithium secondary battery comprising the same, and a lithium secondary battery are described. Specifically, the electrolyte solution additive for a lithium secondary battery may comprise a compound represented by Formula 1,

[Formula 1]

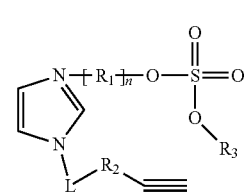

wherein in Formula 1,
$R_1$ to $R_3$, L and n are described herein.

10 Claims, No Drawings

ALKYNATED AND METHYL SULFONATED IMIDAZOLINE NON-AQUEOUS ELECTROLYTE ADDITIVE AND NONAQUEOUS ELECTROLYTE SOLUTION FOR LITHIUM SECONDARY BATTERY INCLUDING THE SAME AND LITHIUM SECONDARY BATTERY

CROSS-REFERENCE TO RELATED APPLICATIONS

This application is a national stage entry under 35 U.S.C. § 371 of International Application No. PCT/KR2023/003126 filed on Mar. 7, 2023, which claims priority from Korean Patent Application Nos. 10-2022-0029662 filed on Mar. 8, 2022, and 10-2023-0028790 filed on Mar. 3, 2023, all the disclosures of which are incorporated by reference herein.

TECHNICAL FIELD

The present disclosure relates to an electrolyte solution additive for a secondary battery, a non-aqueous electrolyte solution for a lithium secondary battery including the same, and a lithium secondary battery, and more specifically relates to an electrolyte solution additive for a secondary battery with an excellent effect of removing decomposition products generated from a lithium salt, a non-aqueous electrolyte solution for a lithium secondary battery including the same, and a lithium secondary battery.

BACKGROUND ART

Dependence on electric energy is increasing in modern society, and renewable energy generation that is capable of increasing production without causing environmental problems is in the spotlight as a next-generation power generation system. In the case of such renewable energy, since it exhibits intermittent power generation characteristics, a large-capacity power storage device is essential in order to stably supply power. Lithium-ion batteries are in the spotlight as a power storage device with the highest energy density that has been commercialized among power storage devices.

The lithium-ion battery includes a positive electrode comprised of a transition metal oxide containing lithium, a negative electrode capable of storing lithium, an electrolyte solution including a non-aqueous organic solvent containing a lithium salt, and a separator.

In the lithium-ion battery, $LiPF_6$ is mainly used as a representative lithium salt in order to achieve suitable characteristics of the battery. However, since the $LiPF_6$ is very vulnerable to heat, it generates Lewis acids, such as $PFD_5$, while being thermally decomposed when the battery is exposed to high temperatures.

Lewis acid materials not only cause a decomposition reaction of the non-aqueous organic solvent such as ethylene carbonate, but also degrades the passivation ability of a solid electrolyte interphase (SEI), etc. formed on a surface of the electrode to cause additional decomposition of the electrolyte solution, an increase in resistance, and dissolution of transition metals from the positive electrode. Furthermore, dissolved transition metal ions become a cause of increasing resistance of the positive electrode while being re-deposited on the positive electrode, and, in contrast, the dissolved transition metal ions cause self-discharge of the negative electrode by being transferred to the negative electrode through the electrolyte solution and then electrodeposited on the negative electrode, and become a cause of increasing resistance and degrading lifetime due to additional consumption of lithium ions caused by destruction and regeneration of the solid electrolyte interphase (SET).

Thus, in order to suppress a degradation behavior of the battery when the battery is exposed to high temperatures, there is a need for a method capable of suppressing additional electrolyte decomposition reactions by reducing SEI attacks due to by-products such as HF and $PF_5$ formed by thermal decomposition of the lithium salt.

Technical Problem in order to solve the above-described problems, the present disclosure aims to provide an electrolyte solution additive for a secondary battery capable of forming a robust passivation film on the surface of the positive electrode and negative electrode while scavenging a decomposition product generated from a lithium salt.

In addition, the present disclosure aims to provide a non-aqueous electrolyte solution for a lithium secondary battery capable of achieving excellent high-temperature stability and high-temperature cycle characteristics by including the electrolyte solution additive for a secondary battery, and a lithium secondary battery including the same.

Technical Solution

According to an aspect of the present invention, the present disclosure provides an electrolyte solution additive for a secondary battery comprising a compound represented by Formula 1 below:

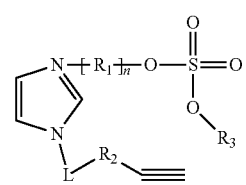

[Formula 1]

In Formula 1,
$R_1$ and $R_2$ are each independently a substituted or unsubstituted alkylene group having 1 to 5 carbon atoms,
$R_3$ is an alkyl group having 1 to 5 carbon atoms,
L is a direct bond, —O—, —COO—, —RO—, or —R'COO—,
R and R' are each independently an alkylene group having 1 to 10 carbon atoms, and
n is an integer from 1 to 10.

According to another aspect of the present disclosure, there is provided a non-aqueous electrolyte solution for a lithium secondary battery comprising the electrolyte solution additive for a secondary battery.

According to another aspect of the present disclosure, there is provided a lithium secondary battery, comprising:
a positive electrode comprising a positive electrode active material,
a negative electrode comprising a negative electrode active material,
a separator disposed between the negative electrode and the positive electrode, and the non-aqueous electrolyte solution for a lithium secondary battery of the present disclosure.

Advantageous Effects

The compound represented by Formula 1 included in the non-aqueous electrolyte solution additive of the present disclosure includes a nitrogen atom of the cationic moiety capable of acting as a Lewis base in the molecular structure, and thus it may effectively scavenge a Lewis acid generated as the decomposition product of the lithium salt. Also, as the compound represented by Formula 1 includes a propargyl group (—CH$_2$C≡CH—) in the molecular structure, it may form a stable film on the surface of the positive electrode or negative electrode.

Thus, since the non-aqueous electrolyte solution for a lithium secondary battery of the present disclosure including the compound represented by Formula 1 forms the stable film on the surface of the positive electrode or negative electrode, it may effectively suppress the dissolution of the transition metals from the positive electrode and may simultaneously scavenge by-products, which are generated by the thermal decomposition of the lithium salt, to reduce the degradation of the solid electrolyte interphase (SEI), and thus, a lithium secondary battery having improved high-temperature durability, such as high-temperature storage characteristics and high-temperature cycle characteristics, may be achieved.

DETAILED DESCRIPTION

First, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

In the present specification, the expression "%" denotes wt % unless explicitly stated otherwise.

Before describing the present disclosure, the expressions "a" and "b" in the description of "a to b carbon atoms" in the specification each denote the number of carbon atoms included in a specific functional group. That is, the functional group may include "a" to "b" carbon atoms.

Also, unless otherwise defined in the specification, the expression "substitution" denotes that at least one hydrogen bonded to carbon is substituted with an element other than hydrogen, for example, an alkyl group having 1 to 5 carbon atoms or a fluorine element.

Hereinafter, various embodiments of the present invention will be described in more detail.

Zn general, a lithium secondary battery may secure high-temperature storage characteristics by forming a film having passivation ability on the surfaces of a positive electrode and a negative electrode while a non-aqueous electrolyte solution is decomposed during initial charge and discharge. However, the film may be degraded by a Lewis acid material, such as HF and PF$_5$, formed by thermal decomposition of a lithium salt (LiPF$_6$, etc.) widely used in a lithium-ion battery. That is, since surface resistance of the electrode is increased due to a change in structure of the surface if dissolution of transition metal ions occurs from the positive electrode by attack of the Lewis acid material and theoretical capacity is reduced as the metallic ions, as redox centers, are lost, apparent capacity may be reduced. Also, since the transition metal ions dissolved as such are electrodeposited on the negative electrode reacting in a strong reduction potential range to not only consume electrons, but also destruct the film when electrodeposited to expose the surface of the negative electrode, an additional non-aqueous electrolyte solution decomposition reaction may be caused. As a result, there is a problem that the capacity of a cell may be continuously reduced while the resistance of the negative electrode and the irreversible capacity are increased.

Thus, the present disclosure aims to provide an electrolyte solution additive for a lithium secondary battery having effects of scavenging a decomposition product generated from the lithium salt and forming a robust passivation film on the surface of the positive electrode and negative electrode, a non-aqueous electrolyte solution for a lithium secondary battery including the same, and a lithium secondary battery.

Electrolyte Solution Additive for Secondary Battery

In the present disclosure, provided is an electrolyte solution additive for a secondary battery which includes a compound represented by the following Formula 1.

[Formula 1]

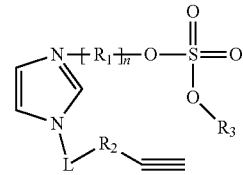

In Formula 1,

R$_1$ and R$_2$ are each independently a substituted or unsubstituted alkylene group having 1 to 5 carbon atoms, R$_3$ is an alkyl group having 1 to 5 carbon atoms, L is a direct bond, —O—, —COO—, —RO—, or —R'COO—, R and R' are each independently an alkylene group having 1 to 10 carbon atoms, and n is an integer from 1 to 10.

Also, in Formula 1, R$_1$ may be a substituted or unsubstituted alkylene group having 2 to 4 carbon atoms, R$_2$ may be a substituted or unsubstituted alkylene group having 1 to 3 carbon atoms, R$_3$ may be an alkyl group having 1 to 3 carbon atoms, L may be —O—, —COO—, or —R'COO—, R' may be an alkylene group having 1 to 5 carbon atoms, and n may be an integer from 1 to 5.

Specifically, the compound represented by Formula 1 may be s compound represented by Formula 1A.

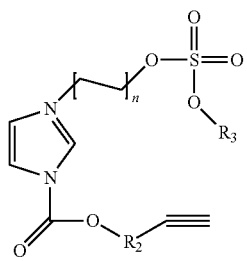

[Formula 1A]

In Formula 1A, $R_2$ is a substituted or unsubstituted alkylene group having 1 to 5 carbon atoms, $R_3$ is an alkyl group having 1 to 5 carbon atoms, and n is an integer from 1 to 10.

Preferably, the compound represented by Formula 1 may be a compound represented by the following Formula 1A-1.

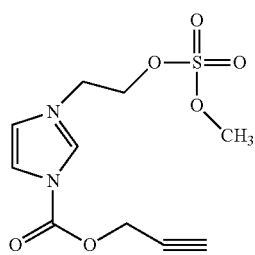

[Formula 1A-1]

In the case of the compound represented by Formula 1, a nitrogen atom with unshared electron pairs included in the molecular structure acts as a Lewis base to form a high binding energy with a Lewis acid material generated as a decomposition product of the lithium salt, and thus it may easily scavenge the decomposition product, etc. of the lithium salt. Further, a nitrogen (N) atom-based material, such as the compound represented by Formula 1 above, may form a nitrogen (N) atom-based film (SEI) which is not easily decomposed and maintained when the battery is exposed to high temperatures on the surface of the negative electrode while being electrochemically, reductively decomposed. As the compound represented by Formula 1 above includes an easily-reducible propargyl group and a sulfonate group as terminal groups in the molecular structure, it may form a film with enhanced durability while being reductively decomposed on the surface of the negative electrode.

Non-Aqueous Electrolyte Solution

Also, the non-aqueous electrolyte solution according to an example of the present disclosure includes the electrolyte solution additive for a secondary battery comprising the compound represented by Formula 1.

Also, the non-aqueous electrolyte solution may further comprise a lithium salt, an organic solvent and selectively other additives.

(1) Electrolyte Solution Additive for Secondary Battery

The non-aqueous electrolyte solution of the present disclosure may include an electrolyte solution additive for a secondary battery comprising a compound represented by Formula 1 above. Since a description of the compound overlaps with that described above, the description thereof will be omitted.

In consideration of an effect of forming a stable film on the surface of the electrode and an effect of scavenging the thermal decomposition product of the lithium salt, the additive may be present in the non-aqueous electrolyte solution in an amount of 0.05 wt % to 5.0 wt % based on a total weight of the non-aqueous electrolyte solution.

In a case in which the electrolyte solution additive for a secondary battery is present in the above range, the dissolution of the transition metal of a positive electrode active material at high temperatures may be effectively suppressed by forming a robust film on the surface of the positive electrode while reducing disadvantages, such as the side reaction due to the additive, a reduction in capacity, and an increase in resistance, as much as possible, and excellent high-temperature durability may be achieved by effectively scavenging the thermal decomposition product of the lithium salt.

That is, if the amount of the electrolyte solution additive for a secondary battery is 0.05 wt % or more, even if the driving time is increased, the effect of scavenging the thermal decomposition product of the lithium salt may be more stably maintained, and the effect of suppressing the dissolution of the transition metals may be further improved by forming a stable film on the surface of the electrode. If the amount of the electrolyte solution additive for a secondary battery is 5.0 wt % or lower, side reactions caused by additives included in a rather large amount may be prevented.

Specifically, the amount of the electrolyte solution additive for a secondary battery may be present in the amount of 0.05 wt % to 5.0 wt %, specifically 0.05 wt % to 4.0 wt % and 0.1 wt % to 3.0 wt %, and more specifically 0.3 wt % to 3.0 wt % based on a total weight of the non-aqueous electrolyte solution.

As described above, the non-aqueous electrolyte solution of the present disclosure forms a robust passivation film on the surface between the electrode and the electrolyte by including the electrolyte solution additive comprising the compound represented by Formula 1 so that a negative electrode reduction reaction of additional transition metals due to the decomposition of the SEI may be controlled and the deposition of the dissolved transition metals on the negative electrode during high-temperature storage may be prevented. Thus, a lithium secondary battery with improved high-temperature durability and long-term lifetime as well as initial performance may be prepared by suppressing side reactions when a high-nickel positive electrode active material is used.

(2) Lithium Salt

The lithium salt typically used in an electrolyte solution for a lithium secondary battery may be used as the lithium salt without limitation, and, for example, the lithium salt may include $Li^+$ as a cation, and may include at least one of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_2^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$ or $SCN^-$ as an anion.

Specifically, the lithium salt may include a single material selected from $LiCl$, $LiBr$, $LiI$, $LiBF_4$, $LiClO_4$, $LiB_{10}Cl_{10}$, $LiAlCl_4$, $LiAlO_2$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$ (Lithium bis(fluorosulfonyl)imide, LiFSI), $LiN(SO_2CF_2CF_3)_2$ (lithium bis (pentafluoroethane sulfonyl)imide, LiBETI) or $LiN(SO_2CF_3)_2$ (lithium bis(trifluoromethane sulfonyl)imide, LiTFSI) or a mixture of two or more thereof. In addition to them, a lithium salt commonly used in an electrolyte solution of a lithium secondary battery may be used without limitation.

The lithium salt may be appropriately changed in a normally usable range but may be included in a concentration of 0.8 M to 4.0 M, and specifically, 1.0 M to 3.0 M in the electrolyte solution to obtain an optimum effect of forming a film for preventing corrosion of the surface of an electrode.

In a case in which the concentration of the lithium salt satisfies the above range, low-temperature output characteristics and cycle characteristics during high-temperature storage may be improved by improving the mobility of lithium ions, and the viscosity of the non-aqueous electrolyte solution may be controlled to achieve optimal impregnability.

(3) Non-Aqueous Organic Solvent

In addition, the non-aqueous organic solvent is described as follows.

Various organic solvents typically used in a non-aqueous electrolyte solution may be used as the non-aqueous organic solvent without limitation, and there is no limitation to the type as long as the non-aqueous organic solvent may minimize the decomposition due to the oxidation reaction during charge and discharge of the secondary battery and may exhibit desired characteristics with the additive.

Specifically, the non-aqueous organic solvent may include a cyclic carbonate-based organic solvent, a linear carbonate-based organic solvent, or a mixed organic solvent thereof.

The cyclic carbonate-based organic solvent is a highly viscous organic solvent which well dissociates the lithium salt in a non-aqueous electrolyte solution due to high permittivity, wherein specific examples thereof may be at least one non-aqueous organic solvent selected from the group consisting of ethylene carbonate (EC), propylene carbonate (PC), 1,2-butylene carbonate, 2,3-butylene carbonate, 2-pentylene carbonate, 2,3-pentylene carbonate, and vinylene carbonate, and may include ethylene carbonate among them.

The linear carbonate-based solvent, as an organic solvent having low viscosity and low permittivity, may include at least one non-aqueous organic solvent selected from dimethyl carbonate (DMC), diethyl carbonate (DEC), dipropyl carbonate, ethylmethyl carbonate (EMC), methylpropyl carbonate, or ethylpropyl carbonate, and specifically, may include ethylmethyl carbonate (EMC).

The cyclic carbonate non-aqueous organic solvent and the linear carbonate non-aqueous organic solvent may be mixed and used as the non-aqueous organic solvent of the present disclosure, and, in this case, the cyclic carbonate non-aqueous organic solvent and the linear carbonate non-aqueous organic solvent may be used by being mixed in a volume ratio of 10:90 to 50:50, specifically, 20:80 to 30:70.

Furthermore, in order to prepare an electrolyte solution having high ionic conductivity, the non-aqueous organic solvent may further include a linear ester-based non-aqueous organic solvent and/or a cyclic ester-based non-aqueous organic solvent with a low melting point and high stability at high temperatures.

As a representative example, the linear ester-based non-aqueous organic solvent may include at least one non-aqueous organic solvent selected from methyl acetate, ethyl acetate, propyl acetate, methyl propionate, ethyl propionate, propyl propionate, or butyl propionate.

Also, the cyclic ester-based non-aqueous organic solvent may include at least one non-aqueous organic solvent selected from γ-butyrolactone, γ-valerolactone, γ-caprolactone, σ-valerolactone, or ε-caprolactone.

A remainder excluding other components excluding the non-aqueous organic solvent in the non-aqueous electrolyte solution of the present disclosure, for example, the electrolyte solution additive for a secondary battery of the present disclosure, the lithium salt, and other additives may all be the non-aqueous organic solvent unless otherwise stated.

(4) Other Additives

Also, the non-aqueous electrolyte solution for a lithium secondary battery of the present disclosure may further include other additives so as to be able to form a more stable film on the surface of the positive electrode and the negative electrode due to a synergistic effect with the compound represented by Formula 1.

The other additives may include at least one of a halogen-unsubstituted or substituted carbonate-based compound, a sultone-based compound, a sulfate-based compound, a phosphate-based or phosphite-based compound, a borate-based compound, a nitrile-based compound, an amine-based compound, a silane-based compound, or a lithium salt-based compound, and may more specifically include a halogen-unsubstituted or substituted carbonate-based compound.

Typical examples of the halogen-unsubstituted or substituted carbonate-based compound may be vinylene carbonate (VC), vinylethylene carbonate, or fluoroethylene carbonate (FEC).

The sultone-based compound may be at least one compound selected from the group consisting of 1,3-propane sultone (PS), 1,4-butane sultone, ethane sultone, and 1,3 propene sultone (PRS).

The sulfate-based compound, for example, may be Ethylene sulfate (ESa), Trimethylene sulfate (TMS), or Methyl trimethylene sulfate (MIMS).

The phosphate-based or phosphite-based compound may be at least one compound selected from the group consisting of lithium difluoro(bisoxalato)phosphate, lithium difluorophosphate, tris(trimethylsilyl)phosphite, and tris(2,2,2-trifluoroethyl)phosphate.

The borate-based compound may be tetraphenylborate, lithium oxalyldifluoroborate (LiODFB), or lithium bisoxalatoborate (LiB($C_2O_4$)$_2$; LiBOB).

The nitrile-based compound, for example, may be at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The lithium salt-based compound is a compound different from the lithium salt included in the non-aqueous electrolyte solution, wherein the lithium snit-based compound may include $LiPO_2F_2$ or $LiBF_4$.

Two or more compounds may be mixed and used as the other additives, and the other additives may be present in an amount of 0.01 wt % to 10 wt %, specifically 0.05 wt % to 7 wt %, and preferably 0.1 wt % to 5 wt % based on the total weight of the non-aqueous electrolyte solution.

If the amount of the other additives present is within the above range, an effect of improving low-temperature output characteristics, high-temperature storage characteristics, and high-temperature life characteristics of the secondary battery may be obtained, and side reactions of the battery due to the excessive amount of the additives may be prevented. Also, it is possible to prevent unreacted materials from being generated or precipitated in the electrolyte solution at room temperature when the other additives may not be sufficiently decomposed at high temperatures.

Lithium Secondary Battery

Next, a lithium secondary battery according to the present disclosure will be described.

The lithium secondary battery according to the present disclosure includes a positive electrode, a negative electrode, a separator disposed between the positive electrode and the negative electrode, and a non-aqueous electrolyte solution, and, in this case, the non-aqueous electrolyte solution may include the non-aqueous electrolyte solution according to the present disclosure. Since the non-aqueous electrolyte solution has been described above, a description thereof will be omitted and other components will be described below.

(1) Positive Electrode

The positive electrode according to the present disclosure may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically include a lithium composite metal oxide represented by the following Formula (2) including lithium and at least one of nickel (Ni), cobalt (Co), manganese (Mn), iron (Fe), or aluminum (Al).

$$Li_{1+a}Ni_xCo_yM^1_zM^2_wO_2 \quad \text{[Formula 2]}$$

In Formula 2, $M^1$ is Mn, Al or a combination thereof, $M^2$ is at least one selected from a group consisting of Al, Zr, W, Ti, Mg, Ca and Sr, wherein $0 \leq a \leq 0.5$, $0 < x \leq 1.0$, $0 < y \leq 0.4$, $0 \leq z \leq 0.4$, $0 \leq w \leq 0.1$.

$1+a$ represents an atomic fraction of lithium in a lithium transition metal oxide, and may be $0 \leq a \leq 0.5$, specifically $0 \leq a \leq 0.2$, more specifically $0 \leq a \leq 0.1$.

x represents an atomic fraction of nickel among all transition metal elements in the lithium transition metal oxide, and may be $0 < x \leq 1.0$, specifically $0.55 < x < 1.0$, more specifically $0.6 \leq x \leq 0.98$, and even more specifically $0.6 \leq x \leq 0.95$.

y represents an atomic fraction of cobalt among all transition metal elements in the lithium transition metal oxide, and may be $0 < y \leq 0.4$, specifically $0 < y \leq 0.3$, and more specifically $0.05 \leq y \leq 0.3$.

z represents an atomic fraction of the element $M^1$ among all transition metal elements in the lithium transition metal oxide, and may be $0 < z \leq 0.4$, preferably $0 < z \leq 0.3$, and more preferably $0.01 \leq z \leq 0.3$.

w represents an atomic fraction of the element $M^2$ among all transition metal elements in the lithium transition metal oxide, and may be $0 < w \leq 0.1$, preferably $0 < w \leq 0.05$, and more preferably $0 < w \leq 0.02$.

Specifically, the positive electrode active material may preferably include a lithium composite transition metal oxide such as $Li(Ni_{0.6}Mn_{0.2}Co_{0.2})O_2$, $Li(Ni_{0.7}Mn_{0.2}Co_{0.1})O_2$, $Li(Ni_{0.9}Mn_{0.1}Co_{0.1})O_2$, $Li(Ni_{0.8}Co_{0.15}Al_{0.05})O_2$, $Li(Ni_{0.86}Mn_{0.07}Co_{0.05}Al_{0.02})O_2$ or $Li(Ni_{0.90}Mn_{0.05}Co_{0.05})O_2$ having a Ni content of 0.55 atm % or more to achieve a high capacity battery.

However, with respect to the high-Ni lithium composite metal oxide, the dissolution of the transition metal occurs due to the structural collapse of the positive electrode after charge/discharge or if it is exposed to high temperatures, causing side reactions. For example, a nickel ion ($Ni^{2+}$) included in the high Ni lithium composite metal oxide exists in the form of a stable nickel ion before charge and discharge, and changes into a $Ni^{3+}$ ion or $Ni^{4+}$ ion as an oxidation number increases after the charge and discharge. Unlike the stable $Ni^{2+}$ ion, the $Ni^{3+}$ ion or $Ni^{4+}$ ion is reduced to the $Ni^{2+}$ ion while rapid oxygen desorption occurs due to instability. Since the desorbed oxygen reacts with the electrolyte solution to change surface properties of the electrode or increase charge transfer impedance of the electrode surface to reduce capacity or high-rate capability, there is a problem in that the energy density is reduced. This phenomenon is further intensified on a surface of a high-Ni positive electrode.

Further, if the structural collapse of the positive electrode occurs due to high-temperature exposure, etc., $Ni^{2+}$ cations elute from the positive electrode into the electrolyte solution and the eluted Nit cations can react with a passivation firm (SEI) of the negative electrode to decompose the SEI film. As a result, a part of the negative electrode active material is exposed to the electrolyte solution, which in turn may cause the deterioration of capacity characteristics and lifetime characteristics and an increase in resistance due to a side reaction. Such problems may be accelerated particularly when HF is present in a large amount in the electrolyte solution.

Thus, in order to solve these problems, it is very important to form a robust film capable of preventing a side reaction with the electrolyte solution on the surface of the high-Ni positive electrode and providing surface stability.

The present disclosure may achieve film stability on the surfaces of the positive electrode comprising the high Ni lithium composite metal oxide by applying a non-aqueous electrolyte solution comprising the compound represented by Formula 1 as an additive, and thus may reduce the side reaction by preventing a contact of the desorbed oxygen or $Ni^{4+}$ ion with the electrolyte solution and effectively suppress the dissolution of the transition metals from the positive electrode.

In the present disclosure, in addition to the above-described high Ni lithium composite metal oxide, the positive electrode active material may further include lithium-manganese-based oxide (e.g., $LiMnO_2$, $LiMn_2O_4$, etc.), lithium-cobalt-based oxide (e.g., $LiCoO_2$ etc.), lithium-nickel-based oxide (e.g., $LiNiO_2$ etc.), lithium-nickel-manganese-based oxide (e.g., $LiNi_{1-Y}Mn_YO_2$ ($0<Y<1$), $LiMn_{2-z}Ni_zO_4$ ($0<Z<2$), lithium-nickel-cobalt-based oxide (e.g., $LiNi_{1-Y1}Co_{Y1}O_2$ ($0<Y1<1$), lithium-manganese-cobalt-based oxide (e.g., $LiCo_{1-Y2}Mn_{Y2}O_2$ ($0<Y2<1$), $LiMn_{2-z1}Co_{z1}O_4$ ($0<Z1<2$), or $Li(Ni_{p1}Co_{q1}Mn_{r2})O_4$ ($0<p1<2$, $0<q1<2$, $0<r2<2$, $p1+q1+r2=2$), etc.

The positive electrode active material may be included in an amount of 80 wt % to 98 wt %, more specifically, 85 wt % to 98 wt % based on a total weight of the positive electrode active material layer. When the positive electrode active material is present in an amount within the above range, excellent capacity characteristics may be exhibited.

Next, the conductive agent is used to provide conductivity to the electrode, wherein any conductive agent may be used without particular limitation as long as it has suitable electron conductivity without causing adverse chemical changes in the battery. Specific examples of the conductive agent may be a conductive material, such as: carbon powder such as carbon black, acetylene black (or DENKA BLACK®), KETJEN BLACK®, channel black, furnace black, lamp black, or thermal black; graphite powder such as natural graphite with a well-developed crystal structure, artificial graphite, or graphite; conductive fibers such as carbon fibers or metal fibers; fluorocarbon; conductive powder such as aluminum powder, or nickel powder; conductive whiskers such as zinc oxide whiskers or potassium titanate whiskers; conductive metal oxide such as titanium oxide; or polyphenylene derivatives, and any one thereof or a mixture of two or more thereof may be used.

The conductive agent may be present in an amount of 0.1 wt % to 10 wt %, preferably, 0.1 wt % to 5 wt % based on a total weight of the positive electrode active material layer.

Next, the binder improves the adhesion between positive electrode active material particles and the adhesion between the positive electrode active material and a current collector.

As an example of the binder, any one of a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; or a silane-based binder or a mixture of two or more thereof may be used.

The binder may be present in an amount of 0.1 wt % to 15 wt %, preferably, 0.1 wt % to 10 wt % based on a total weight of the positive electrode active material layer.

The positive electrode of the present disclosure as described above may be prepared by a method of preparing a positive electrode which is known in the art. For example, the positive electrode may be prepared by a method in which a positive electrode collector is coated with a positive electrode slurry, which is prepared by dissolving or dispersing the positive electrode active material, the binder, and/or the conductive agent in a solvent, dried, and then rolled to form an active material layer, or a method in which the positive electrode active material layer is cast on a separate support and a film separated from the support is then laminated on the positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode material. The positive electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if a positive electrode material mixture may be adjusted to have appropriate viscosity in consideration of a coating thickness of the positive electrode material mixture, manufacturing yield, and workability, and is not particularly limited.

(2) Negative Electrode

Next, a negative electrode will be described.

The negative electrode according to the present disclosure includes a negative electrode active material layer including a negative electrode active material, and the negative electrode active material layer may further include a conductive agent and/or a binder, if necessary.

Various negative electrode active materials used in the art, for example, a carbon-based negative electrode active material, a silicon-based negative electrode active material, or a mixture thereof may be used as the negative electrode active material.

According to an embodiment, the negative electrode active material may include a carbon-based negative electrode active material, and, as the carbon-based negative electrode active material, various carbon-based negative electrode active materials used in the art, for example, a graphite-based materials such as natural graphite, artificial graphite, and Kish graphite; pyrolytic carbon, mesophase pitch based carbon fiber, meso-carbon microbeads, mesophase pitches, high-temperature sintered carbon such as petroleum or coal tar pitch derived cokes, soft carbon, or hard carbon may be used. A shape of the carbon-based negative electrode active material is not particularly limited, and materials of various shapes, such as an irregular shape, planar shape, flaky shape, spherical shape, or fibrous shape, may be used.

Preferably, the carbon-based negative electrode active material may include at least one of natural graphite or artificial graphite. More preferably, the carbon-based negative electrode active material may include natural graphite and artificial graphite. In a case in which the natural graphite and the artificial graphite are used together, adhesion with the current collector may be increased to suppress exfoliation of the active material.

According to another embodiment, the negative electrode active material may include a carbon-based negative electrode active material and a silicon-based negative electrode active material.

Specific examples of the carbon-based negative electrode active material are the same as described above.

The silicon-based negative electrode active material, for example, may include at least one metallic silicon (Si), silicon oxide ($SiO_x$, where 0<x<2), silicon carbide (SiC), or a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, Ca, Sr, Ba, Ra, Sc, Y, Ti, Zr, Hf, Rf, V, Nb, Ta, Db (dubnium), Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Since the silicon-based negative electrode active material has higher capacity characteristics than the carbon-based negative electrode active material, better capacity characteristics may be obtained when the silicon-based negative electrode active material is further included. However, with respect to a negative electrode including the silicon-based negative electrode active material, it contains more oxygen (O)-rich (O-rich) components in the SEI than a graphite negative electrode, and the SET containing the O-rich components tends to be more easily decomposed when a Lewis acid, such as HF or $PF_5$, is present in the electrolyte solution. Thus, with respect to the negative electrode including the silicon-based negative electrode active material, there is a need to suppress the formation of the Lewis acid, such as HF and $PF_5$, in the electrolyte solution or remove (or scavenge) the formed Lewis acid in order to stably maintain the SET. Since the non-aqueous electrolyte solution according to the present disclosure includes the electrolyte solution additive capable of forming a stable film on the positive electrode and the negative electrode, it may effectively suppress the decomposition of the SEI film when the negative electrode including the silicon-based negative electrode active material is used.

A mixing ratio of the silicon-based negative electrode active material to the carbon-based negative electrode active material may be in a range of 3:97 to 99:1, preferably, 5:95 to 15:85, as a weight ratio. When the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

Next, the conductive agent is a component for further improving conductivity of the negative electrode active material, wherein the conductive agent may be added in an amount of 10 wt % or less, preferably, 5 wt % or less based on the total weight of the negative electrode active material layer. The conductive agent is not particularly limited as long as it has conductivity without causing adverse chemical changes in the battery, and, for example, a conductive material such as carbon powder such as carbon black, acetylene black (or DENKA BLACK®), KETJEN BLACK®, channel black, furnace black, lamp black, or thermal black; graphite powder such as natural graphite with a well-developed crystal structure, artificial graphite, or graphite; conductive fibers such as carbon fibers or metal fibers; fluorocarbon; conductive powder such as aluminum powder, or nickel powder; conductive whiskers such as zinc oxide whiskers or potassium titanate whiskers; conductive metal oxide such as titanium oxide; or polyphenylene derivatives, may be used.

The binder is a component that assists in the binding between the conductive agent, the active material, and the current collector, wherein it is commonly added in an amount of 0.1 wt % to 10 wt % based on the total weight of the negative electrode active material layer. Examples of the binder may be a fluorine resin-based binder including polyvinylidene fluoride (PVDF) or polytetrafluoroethylene (PTFE); a rubber-based binder including a styrene-butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; or a silane-based binder.

The binder may be present in an amount of 0.1 wt % to 15 wt preferably 0.1 wt % to 10 wt based on the total weight of the negative electrode active material layer.

The negative electrode may be prepared by a method of preparing a negative electrode which is known in the art. For example, the negative electrode may be prepared by a method in which a negative electrode collector is coated with a negative electrode slurry, which is prepared by dissolving or dispersing the negative electrode active material as well as selectively the binder and the conductive agent in a solvent, rolled and dried, or may be prepared by casting the negative electrode slurry on a separate support and then Laminating a film separated from the support on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. The negative electrode collector may typically have a thickness of 3 μm to 500 μm, and, similar to the positive electrode collector, microscopic irregularities may be formed on the surface of the collector to improve the adhesion of the negative electrode active material. The negative electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the negative electrode slurry may be adjusted to have an appropriate viscosity in consideration of a coating thickness of the negative electrode material mixture, manufacturing yield, and workability, and is not particularly limited.

(3) Separator

The lithium secondary battery according to the present disclosure includes a separator between the positive electrode and the negative electrode.

The separator separates the negative electrode and the positive electrode and provides a movement path of lithium ions, wherein any separator may be used without particular limitation as long as it is typically used as a separator in a lithium secondary battery, and particularly, a separator having high moisture-retention ability for an electrolyte solution as well as low resistance to the transfer of ions of the lithium salt is preferable.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, or an ethylene/methacrylate copolymer, or a laminated structure having two or more layers thereof may be used as a separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be optionally used.

The lithium secondary battery according to the present disclosure as described above may be suitably used in portable devices, such as mobile phones, notebook computers, and digital cameras, and electric cars such as a hybrid electric vehicle (HEV).

Thus, according to another embodiment of the present invention, a battery module including the lithium secondary battery as a unit cell and a battery pack including the battery module are provided. The battery module or the battery pack may be used as a power source of at least one medium or large sized device of a power tool; electric cars including an electric vehicle (EV), a hybrid electric vehicle (HEV), and a plug-in hybrid electric vehicle (PHEV); or a power storage system.

A shape of the lithium secondary battery of the present disclosure is not particularly limited, but a cylindrical type using a can, a prismatic type, a pouch type, or a coin type may be used.

The lithium secondary battery according to the present disclosure may not only be used in a battery cell that is used as a power source of a small device, but may also be used as a unit cell in a medium and large sized battery module including a plurality of battery cells.

Hereinafter, the present disclosure will be described in detail, according to specific examples.

EXAMPLES

Example 1

(Non-Aqueous Electrolyte Solution Preparation)

$LiPF_6$ was dissolved in a non-aqueous organic solvent, in which ethylene carbonate (EC) and dimethyl carbonate (DMC) were mixed in a volume ratio of 30:70, such that a concentration of the $LiPF_6$ was 1.2 M, and a non-aqueous electrolyte solution was prepared by adding 0.3 wt % of the compound represented by Formula 1A-1 and 2.0 wt % of vinylene carbonate and 1.0 wt % of 1,3-propanesultone as other additives (see Table 1 below).

(Positive Electrode Preparation)

Positive electrode active material particles (Li($Ni_{0.8}Co_{0.1}Mn_{0.1}$)$O_2$), carbon black as a conductive agent, and polyvinylidene fluoride (PVDF), as a binder were added to N-methyl-2-pyrrolidone (NMP) which is a solvent, at a weight ratio of 97.5:1:1.5 to prepare a positive electrode active material slurry (solid content 48 wt %). A 15 μm thick positive electrode collector (Al thin film) was coated with the positive electrode active material slurry, dried, and then roll-pressed to prepare a positive electrode.

(Negative Electrode Preparation)

A negative electrode active material (artificial graphite: SiO=96:4 weight ratio), PVDF as a binder, and carbon black, as a conductive agent, were added to NMP, as a solvent, at a weight ratio of 95:3.5:1.5 to prepare a negative electrode active material slurry (solid content: 70 wt %). A 6 μm thick negative electrode collector (Cu thin film) was coated with the negative electrode active material slurry, dried, and then roll-pressed to prepare a negative electrode.

(Secondary Battery Preparation)

After an electrode assembly was prepared by a conventional method of sequentially stacking a polyethylene porous film with the positive electrode and negative electrode prepared by the above-described methods, the electrode assembly was put in a cylindrical type secondary battery case, and the above-prepared non-aqueous electrolyte solution was injected thereinto to prepare a lithium secondary battery.

Example 2

A lithium secondary battery was prepared in the same manner as in Example 1 except that a non-aqueous electrolyte solution was prepared by adding 1.0 wt % of the compound represented by Formula 1A-1 and 2.0 wt % of vinylene carbonate and 1.0 wt % of 1,3-propanesultone as other additives to the non-aqueous organic solvent.

Example 3

A lithium secondary battery was prepared in the same manner as in Example 1 except that a non-aqueous electrolyte solution was prepared by adding 1.0 wt % of the compound represented by Formula 1A-1 and 2.0 wt % of vinylene carbonate, 1.0 wt % of 1,3-propanesultone and 1.0 wt % of ethylene sulfate as other additives to the non-aqueous organic solvent.

Example 4

A lithium secondary battery was prepared in the same manner as in Example 1 except that a non-aqueous electrolyte solution was prepared by adding 2.0 wt of the compound represented by Formula 1A-1 and 2.0 wt % of vinylene carbonate, and 1.0 wt %, of 1,3-propanesultone as other additives to the non-aqueous organic solvent.

Example 5

A lithium secondary battery was prepared in the same manner as in Example 1 except that a non-aqueous electrolyte solution was prepared by adding 0.1 wt % of the compound represented by Formula 1A-1 and 2.0 wt % of vinylene carbonate, and 1.0 wt % of 1,3-propanesultone as other additives to the non-aqueous organic solvent.

Example 6

A lithium secondary battery was prepared in the same manner as in Example 1 except that a non-aqueous electrolyte solution was prepared by adding 5.0 wt % of the compound represented by Formula 1A-1 and 2.0 wt % of vinylene carbonate, and 1.0 wt % of 1,3-propanesultone as other additives to the non-aqueous organic solvent.

Comparative Example 1

(Non-Aqueous Electrolyte Solution Preparation)

$LiPF_6$ was dissolved in a non-aqueous organic solvent, in which ethylene carbonate (EC) and dimethyl carbonate (DMC) were mixed in a volume ratio of 30:70, such that a concentration of the $LiPF_6$ was 1.2 M, and a non-aqueous electrolyte solution was prepared by adding 2.0 wt % of vinylene carbonate and 1.0 wt % of 1,3-propanesultone as other additives (see Table 1 below).

(Secondary Battery Preparation)

A lithium secondary battery was prepared in the same manner as in Example 1 except that the above prepared non-aqueous electrolyte solution was injected instead of the non-aqueous electrolyte solution of Example 1.

Comparative Example 2

(Non-Aqueous Electrolyte Solution Preparation)

$LiPF_6$ was dissolved in a non-aqueous organic solvent, in which ethylene carbonate (EC) and dimethyl carbonate (DMC) were mixed in a volume ratio of 30:70, such that a concentration of the $LiPF_6$ was 1.2 M, and a non-aqueous electrolyte solution was prepared by adding 2.0 wt % of vinylene carbonate, 1.0 wt % of 1,3-propanesultone and 1.0 wt % of ethylene sulfate as other additives (see Table 1 below).

(Secondary Battery Preparation)

A lithium secondary battery was prepared in the same manner as in Example 1 except that the above prepared non-aqueous electrolyte solution was injected instead of the non-aqueous electrolyte solution of Example 1.

Comparative Example 3

A lithium secondary battery was prepared in the same manner as in Example 1 except that a non-aqueous electrolyte solution was prepared by adding a compound represented by the following Formula 3 instead of the compound represented by Formula 1A-1.

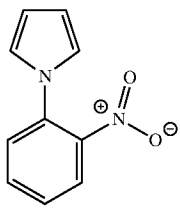

[Formula 3]

A zwitterion compound of an imidazole structure represented by Formula 3 in which a phenyl group is bonded to a nitrogen element above forms a nitrophenyl-based SEI. Since the nitrophenyl-based SEI has greater binding energy with lithium ions than a sulfonate-based SEI, lithium ion transfer properties may be deteriorated, thereby resulting in an increase of the initial resistance and a decrease in capacity retention.

Comparative Example 4

A lithium secondary battery was prepared in the same manner as in Example 1 except that a non-aqueous electrolyte solution was prepared by adding a compound represented by the following Formula 4 instead of the compound represented by Formula 1A-1.

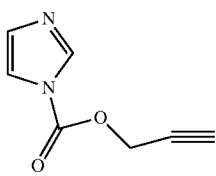

[Formula 4]

Comparative Example 5

A lithium secondary battery was prepared in the same manner as in Example 1 except that a non-aqueous electrolyte solution was prepared by adding a compound represented by the following Formula 5 instead of the compound represented by Formula 1A-1.

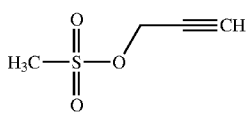

[Formula 5]

As the compound represented by Formula 5 above includes a propargyl group and a sulfonate group in the structure, the LUMO value is low which leads to an easy reduction, but it does not include a functional group that can act as a Lewis base, and thus the effect of inhibiting the formation of Lewis acids such as HF is low. For this reason, the film may be deteriorated by Lewis acids, which may increase resistance or decrease high-temperature durability.

TABLE 1

| | Electrolyte solution additive of the present disclosure | | Other additives | |
|---|---|---|---|---|
| | Formula | Amount (wt %) | Type | Amount (wt %) |
| Example 1 | 1A-1 | 0.3 | VC | 2.0 |
| | | | PS | 1.0 |
| Example 2 | 1A-1 | 1.0 | VC | 2.0 |
| | | | PS | 1.0 |
| Example 3 | 1A-1 | 1.0 | VC | 2.0 |
| | | | PS | 1.0 |
| | | | ESa | 1.0 |
| Example 4 | 1A-1 | 2.0 | VC | 2.0 |
| | | | PS | 1.0 |
| Example 5 | 1A-1 | 0.1 | VC | 2.0 |
| | | | PS | 1.0 |
| Example 6 | 1A-1 | 5.0 | VC | 2.0 |
| | | | PS | 1.0 |
| Comparative Example 1 | — | — | VC | 2.0 |
| | | | PS | 1.0 |
| Comparative Example 2 | — | — | VC | 2.0 |
| | | | PS | 1.0 |
| | | | ESa | 1.0 |
| Comparative Example 3 | 3 | 0.3 | VC | 2.0 |
| | | | PS | 1.0 |
| Comparative Example 4 | 4 | 0.3 | VC | 2.0 |
| | | | PS | 1.0 |
| Comparative Example 5 | 5 | 0.3 | VC | 2.0 |
| | | | PS | 1.0 |

In Table 1, the abbreviations of compounds are as follows.
VC: vinylene carbonate
PS: 1,3- propanesultone
ESa: ethylene sulfate Experimental Examples Experimental Example 1: Evaluation of Capacity Retention After High-Temperature Storage (1)

After each of the lithium secondary batteries prepared in Examples 1 to 6 and Comparative Examples 1 to 5 was fully charged (SOC 100%) at 0.5 C rate to 4.25 V under a constant current/constant voltage condition at room temperature (25° C.) (with a cut off at 0.05 C) and discharged at 0.5 C rate to 2.5 V under a CC condition, discharge capacity before high-temperature storage were measured using PNE-0506 charge/discharge equipment (manufacturer: PNE solution).

Subsequently, after being stored at 55° C. for 2 months, capacity after high-temperature storage were measured for each lithium secondary battery, and the high-temperature capacity retention (%) was then calculated using Equation 1 below. The results thereof are then presented in Table 2 below.

Capacity retention (%) = [Equation 1]

(discharge capacity after 2−month high temperature storage/ discharge capacity before high temperature storage) × 100

Experimental Example 2. Evaluation of Resistance Increase Rata After High-Temperature Storage (2)

After each of the lithium secondary batteries prepared in Examples 1 to 6 and Comparative Examples 1 to 5 was charged at 0.5 C rate to 4.25 V under a constant current/constant voltage condition at room temperature (25° C.), discharged to a DOD (depth of discharge) of 50% to adjust a SOC to 50% and then discharged at 0.5 C rate for 10 seconds, initial resistance was then measured using PNE-0506 charge/discharge equipment (manufacturer: PNE solution).

Subsequently, after being stored at 55° C. for 2 months, the resistance value was measured for each lithium secondary battery, and the resistance increase rate (%) was calculated using Equation 2 below. The results thereof are then presented in Table 2 below.

$$\text{Resistance increase rate (\%)} = \{(\text{resistance value after 2-month high temperature storage} - \text{resistance value before high temperature storage})/ \text{resistance value before high temperature storage}\} \times 100 \quad \text{[Equation 2]}$$

Experimental Example 3. Evaluation of Gas Generation Amount After High-Temperature Storage (3)

After each of the lithium secondary batteries prepared in Examples 1 to 6 and Comparative Examples 1 to 5 was fully charged (SOC 100%) at 0.5 C rate to 4.25 V under a constant current/constant voltage condition at room temperature (25° C.).

Subsequently, after being stored at 72° C. for 2 months, the amount (%) of gas generated was measured for each lithium secondary battery, and the results thereof are then presented in Table 2 below.

TABLE 2

|  | Capacity retention (%) after high temperature storage | Resistance increase rate (%) after high temperature storage | Gas generation amount (%) after high temperature storage |
|---|---|---|---|
| Example 1 | 88.7 | 14.2 | 93.0 |
| Example 2 | 91.7 | 11.7 | 89.5 |
| Example 3 | 93.5 | 10.0 | 86.1 |
| Example 4 | 95.4 | 6.3 | 77.2 |
| Example 5 | 88.1 | 15.8 | 94.0 |
| Example 6 | 88.3 | 20.4 | 95.5 |
| Comparative Example 1 | 85.2 | 31.4 | 100.0 |
| Comparative Example 2 | 87.9 | 30.8 | 96.7 |
| Comparative Example 3 | 86.1 | 30.4 | 97.5 |
| Comparative Example 4 | 87.0 | 29.7 | 96.1 |
| Comparative Example 5 | 85.5 | 31.2 | 98.1 |

Referring to Table 2 above, it may be understood that the secondary batteries of Examples 1 to 6 have improved capacity retention (%) after high temperature storage when compared to the secondary batteries of Comparative Examples 1 to 5.

Also, it may be understood that the secondary batteries of Examples 1 to 6 have an improved resistance increase rate (%) and gas generation amount (%) after high temperature storage when compared to the secondary batteries of Comparative Examples 1 to 5.

Experimental Example 4. Evaluation of High-Temperature Cycle Characteristics (1)

After each of the lithium secondary batteries prepared in Examples 1 to 6 and Comparative Examples 1 to 5 was charged at 0.3 C rate to 4.25 V under a constant current-constant voltage (CC-CV) condition at 40° C. and discharged at 0.5 C rate to 2.85 V under a CC condition, which is set as one cycle. 250 cycles of charging and discharging were performed, and the resistance increase rate (%) was calculated using Equation 3 below. The results thereof are then presented in Table 3 below.

$$\text{Resistance increase rate (\%)} = \{(\text{resistance after 250 cycles of charging and discharging} - \text{resistance after 1 cycle of charging and discharging})/ \text{resistance after 1 cycle of charging and discharging}\} \times 100 \quad \text{[Equation 3]}$$

TABLE 3

|  | Resistance increase rate (%) after 250 cycles |
|---|---|
| Example 1 | 17.4 |
| Example 2 | 16.4 |
| Example 3 | 15.1 |
| Example 4 | 10.9 |
| Example 5 | 18.1 |
| Example 6 | 19.1 |
| Comparative Example 1 | 21.5 |
| Comparative Example 2 | 20.6 |
| Comparative Example 3 | 22.4 |
| Comparative Example 4 | 20.9 |
| Comparative Example 5 | 21.9 |

Referring to Table 3 above, it may be understood that the secondary batteries of Examples 1 to 6 have an improved resistance increase rate (%) after the 250 cycles when compared to the secondary batteries of Comparative Examples 1 to 5.

Experimental Example 5. Hot Box Evaluation

Hot box tests were performed in which the lithium secondary batteries prepared in Examples 1 to 6 and Comparative Examples 1, 2 and 4 were heated to 130° C. at a heating rate of 5° C./min in a fully charged state (SOC 100%), and were then respectively left standing for 30 minutes to confirm the presence of ignition.

The results thereof are presented in Table 4 below. When the battery ignited, it was marked as FAIL, and if it did not ignite, it was marked as PASS.

TABLE 4

| | Hot box evaluation |
|---|---|
| Example 1 | PASS |
| Example 2 | PASS |
| Example 3 | PASS |
| Example 4 | PASS |
| Example 5 | PASS |
| Example 6 | PASS |
| Comparative Example 1 | Fail |
| Comparative Example 2 | Fail |
| Comparative Example 4 | PASS |

It may be understood through the results of Table 4 above that the secondary batteries of Examples 1 to 6 have superior thermal stability during high temperature cycles when compared to the secondary batteries of Comparative Examples 1 and 2.

It may be understood that the secondary battery of Comparative Example 4, where a non-aqueous electrolyte solution comprising the compound of Formula 4 containing a propargyl group was used, has thermal stability similar to the secondary batteries of Examples 1 to 6 due to the film forming effect resulting from the propargyl group.

The invention claimed is:

1. An electrolyte solution additive for a secondary battery, comprising a compound represented by Formula 1:

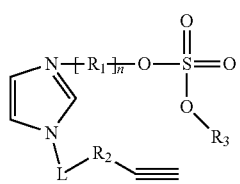

[Formula 1]

wherein in Formula 1,
$R_1$ and $R_2$ are each independently an alkylene group having 1 to 5 carbon atoms,
$R_3$ is an alkyl group having 1 to 5 carbon atoms,
L is a direct bond, —O—, —COO—, —RO—, or —R'COO—,
R and R' are each independently an alkylene group having 1 to 10 carbon atoms, and
n is an integer from 1 to 10.

2. The electrolyte solution additive according to claim 1, wherein $R_1$ is a substituted or unsubstituted alkylene group having 2 to 4 carbon atoms,
$R_2$ is a substituted or unsubstituted alkylene group having 1 to 3 carbon atoms,
$R_3$ is an alkyl group having 1 to 3 carbon atoms,
L is —O—, —COO—, or —R'COO—, wherein R' is an alkylene group having 1 to 5 carbon atoms, and
n is an integer from 1 to 5.

3. The electrolyte solution additive according to claim 1, wherein the compound represented by Formula 1 comprises a compound represented by Formula 1A:

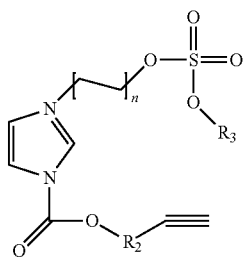

[Formula 1A]

wherein in Formula 1A,
$R_2$ is a substituted or unsubstituted alkylene group having 1 to 5 carbon atoms,
$R_3$ is an alkyl group having 1 to 5 carbon atoms, and
n is an integer from 1 to 10.

4. The electrolyte solution additive according to claim 1, wherein the compound represented by Formula 1 comprises a compound represented by Formula 1A-1:

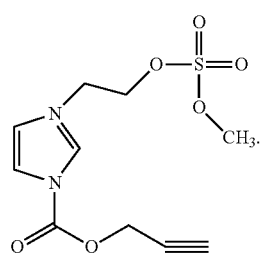

[Formula 1A-1]

5. A non-aqueous electrolyte solution for a lithium secondary battery, comprising the electrolyte solution additive according to claim 1.

6. The non-aqueous electrolyte solution according to claim 5, wherein the electrolyte solution additive is present in an amount of 0.05 wt % to 5.0 wt % based on a total weight of the non-aqueous electrolyte solution.

7. The non-aqueous electrolyte solution according to claim 5, wherein the electrolyte solution additive is present in an amount of 0.05 wt % to 4.0 wt % based on a total weight of the non-aqueous electrolyte solution.

8. The non-aqueous electrolyte solution according to claim 5, further comprising a lithium salt and a non-aqueous organic solvent.

9. The non-aqueous electrolyte solution according to claim 5, further comprising at least one other additive of a halogen-unsubstituted or substituted carbonate-based compound, a sultone-based compound, a sulfate-based compound, a phosphate-based or phosphite-based compound, a borate-based compound, a nitrile-based compound, an amine-based compound, a silane-based compound, or a lithium salt-based compound.

10. A lithium secondary battery, comprising:
a positive electrode comprising a positive electrode active material,
a negative electrode comprising a negative electrode active material,
a separator disposed between the negative electrode and the positive electrode, and
the non-aqueous electrolyte solution according to claim 5.

* * * * *